Sept. 10, 1940.　　　H. O. RASTETTER　　　2,214,381
ADJUSTABLE COUPLING
Filed June 3, 1938
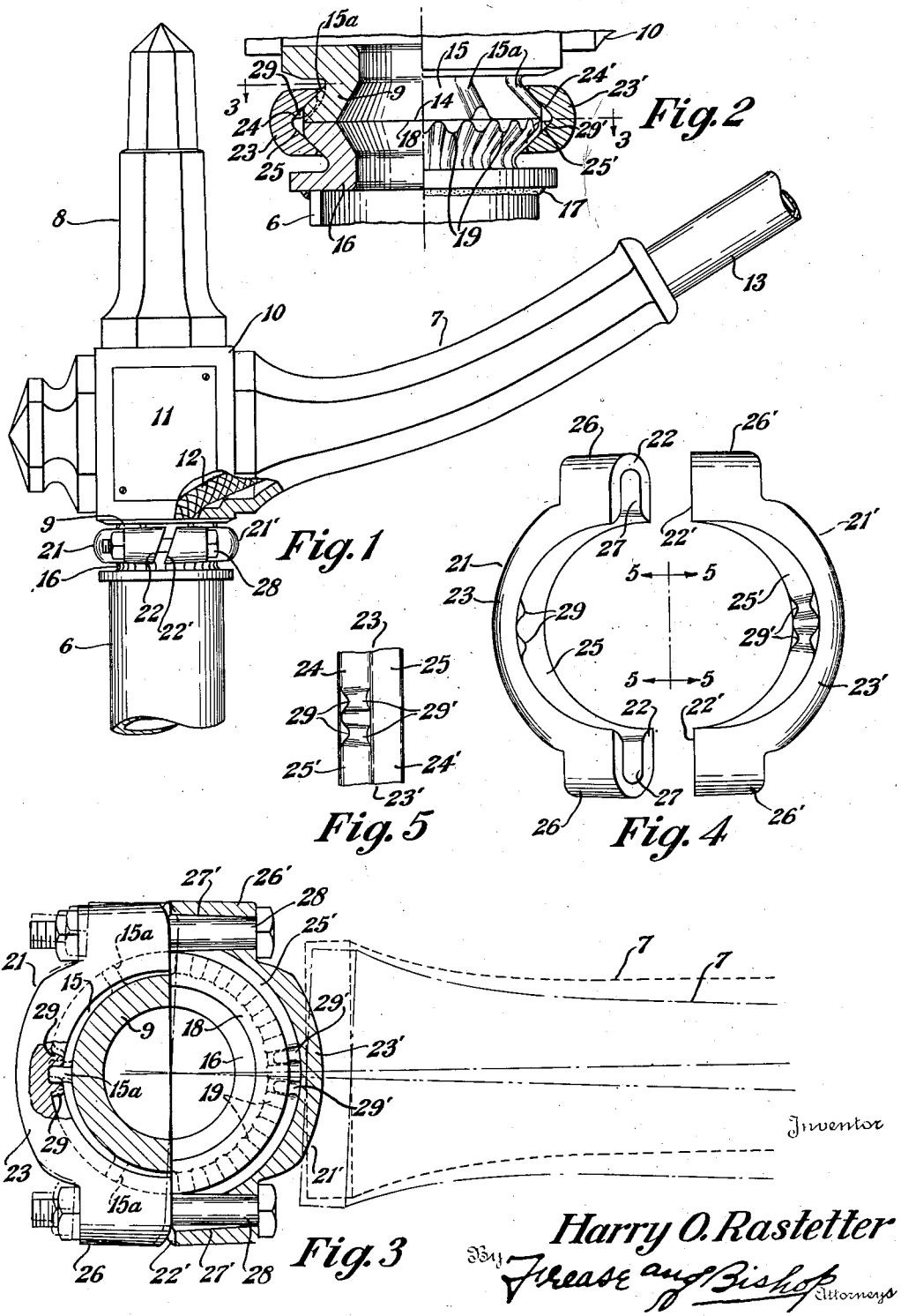
Inventor
Harry O. Rastetter Patented Sept. 10, 1940

2,214,381

UNITED STATES PATENT OFFICE 2,214,381

ADJUSTABLE COUPLING

Harry O. Rastetter, Canton, Ohio, assignor to The Union Metal Manufacturing Company, Canton, Ohio, a corporation of Ohio Application June 3, 1938, Serial No. 211,610

3 Claims. (Cl. 285—129)

The invention relates generally to coupling means for connecting two members together, and more particularly to an improved coupling providing for rotatable adjustment of one of the connected members with respect to the other member.

The improved coupling is particularly adapted for connecting a laterally extending lamp bracket arm with the top of a supporting standard or pole.

In the installation of tubular lamp standards having lateral arms connected thereto, heavy conductor cables are extended through the tubular standard and thence through the bracket arm to supply current to the lamp or lamps supported thereby. In order to facilitate the insertion of these cables, particularly at the sharp turn required at the junction of the standard and the bracket arm, it is highly desirable to make the bracket arm separable from the standard preferably at the top thereof.

A suitable form of coupling is required for making the connection between the bracket arm and the top of the standard, and said coupling should not project into the interior of the joint because it would be apt to interfere with the cables passed therethrough especially in the case of small diameter standards, but said coupling should securely clamp the bracket arm to the standard to prevent turning movement of the bracket arm with respect to the standard.

However, when the installation is completed the bracket arm is required to extend from the standard at right angles to the curb or center line of the street on which it is situated, and after the bracket arm is in place on the top of the standard it is often necessary to adjust or rotate the bracket arm on the pole in order to obtain the proper angular position thereof.

With prior coupling constructions such an adjustment is very difficult to make after the arm is in place, and no provision is made for securely clamping the bracket arm in adjusted position.

It is therefore an object of the present invention to provide novel coupling means for connecting two members together in such a way as to provide for relative rotatable adjustment thereof without disconnecting the members.

Another object is to provide an improved coupling for adjustably connecting two members together and for securely clamping the members in any desired relatively rotated position.

A further object is to provide improved coupling means for connecting a lamp bracket arm to the top of a supporting standard.

A still further object is to provide improved coupling means for adjustably connecting a bracket arm to a lamp standard so as to facilitate inserting the necessary conductor cables through the standard and arm.

And finally, it is an object of the present invention to provide a novel coupling construction which accomplishes all of the foregoing objectives, which construction is simple and inexpensive to make and renders the installation of lamp standards with their brackets at the proper lateral angle thereto a rapid and easy operation.

These and other objects are accomplished by the parts, improvements, elements, combinations, sub-combinations and arrangements embodying the present invention which is disclosed and described herein and which is particularly defined in the appended claims.

In general terms the invention may be stated as including two-part coupling including means for clamping the parts together around the joint between the members connected thereby, one part engaging one of the members and the other part engaging the other member, and the clamping means being operable to rotate one coupling part together with the member engaged thereby, with respect to the other coupling part and the other member engaged thereby.

Referring to the drawing forming part hereof, in which a preferred embodiment of the invention is shown by way of example—

Figure 1 is a fragmentary elevational view showing a lamp bracket arm connected to the top of a standard by means of the improved coupling;

Fig. 2 is an enlarged fragmentary view at the joint between the bracket arm and standard, showing the coupling in section, and the adjoining ends of the coupled members partly in section and partly in elevation;

Fig. 3 is a transverse sectional view taken substantially on line 3—3, Fig. 2, showing an adjusted position of the arm in dot-dash lines;

Fig. 4 is a detached perspective view of the two parts of the improved coupling; and Fig. 5 is a fragmentary elevational view looking in either direction of the arrows 5—5 in Fig. 4.

Similar numerals refer to similar parts throughout the several views of the drawing.

In Fig. 1, the top portion of a metal pole or standard is indicated at 6, and a laterally extending lamp bracket arm 7 is shown connected thereto. The bracket arm 7 may have an ornamental cap piece 8 provided with an abutment collar 9 at its lower end, an enlarged housing 10 being preferably provided between the cap piece 8 and arm 7 and having a removable plate 11 for facilitating the insertion of electric conductor cables 12 around the turn between the standard and arm.

The particular construction of the lateral arm and its cap piece forms no part of the present invention but is shown merely by way of example, the improved coupling being adapted for use with various sizes and shapes of lateral arms as well as various sizes and shapes of standards. In the form of arm shown in Fig. 1, a cylindrical extension 13 is shown connected to the arm for supporting a lamp or lamps at its outer end.

As shown, the abutment collar 9 has a flat abutment surface 14 on its underside and is annular in cross section, having an outwardly flared or inclined outer surface 15 provided with a series of circumferentially spaced ribs 15a preferably inclined outwardly substantially parallel with said surface 15.

A similar annular abutment collar 16 is preferably provided at the top of standard 6 and may be welded thereto, as indicated at 17. The abutment collar 16 is annular in cross section having a flat upper abutment surface 18 for slidably abutting and conforming to the abutment surface 14 of collar 9. The outer surface of collar 16 is serrated or corrugated to provide circumferentially arranged ribs 19 inclined outwardly and upwardly forming an outwardly inclined corrugated outer surface, said ribs 19 preferably being provided around the entire periphery of collar 16.

The improved coupling preferably includes two parts 21 and 21' which are each generally semi-circular in shape and for manufacturing purposes may be identical. When the two identical parts are assembled, one of them is inverted with respect to the other and their opposing adjacent surfaces 22 and 22' are angularly inclined with respect to the axis of the coupling so that the parts 21 and 21' will fit together in one way only, as best shown in Fig. 1.

The curved or substantially semi-circular portion 23 of the coupling part 21 is provided with inner oppositely inclined upper and lower surfaces 24 and 25 intersecting to form a V-shaped inner surface. Likewise, the portion 23' of coupling part 21' is provided with inner oppositely inclined upper and lower surfaces 24' and 25' intersecting to form a V-shaped inner surface, and the V-shaped surfaces of the two coupling parts open toward each other when assembled, as shown in Fig. 2.

Ears 26 and 26' extend from opposite ends of said curved portions 23 and 23' respectively, and are provided with registering bores 27 and 27' for receiving bolts 28 to clamp the parts 21 and 21' together.

The upper inclined surface 24 of part 21 is provided centrally of the curved portion 23 with a plurality of ribs 29, two being shown in the drawing, extending downwardly and outwardly, substantially from the top of surface 24 to the lower inclined surface 25. Similarly, the inclined lower surface 25' of part 21' is provided centrally of curved portion 23' with a plurality of ribs 29', two being shown in the drawing, extending upwardly and outwardly, substantially from the bottom side of surface 25' to the upper inclined surface 24'.

Since the ribs 29 and 29' are located on upper inclined surface 24 and lower inclined surface 25' when the coupling parts are assembled, Fig. 5 represents a fragmentary view looking toward ribs 29 or in the opposite direction towards ribs 29', as indicated by arrows 5—5 in Fig. 4, and accordingly the reference numerals for both coupling parts are applied to Fig. 5.

The upper inclined inner surfaces 24 and 24' of coupling parts 21 and 21' are adapted to substantially conform to the inclination of the ribs 15a on collar 9, and the lower inclined inner surfaces 25 and 25' of said coupling parts are adapted to substantially conform to the inclination of the ribs 19 on collar 16. Accordingly when the coupling parts engirdle and are clamped around said collars and drawn together by the clamping bolts 28, the inclined surfaces of the coupling parts exert a wedging action on the collars 9 and 16 to securely clamp the abutting surfaces 14 and 18 thereof together.

When the coupling parts 21 and 21' are clamped around the abutting collars 9 and 16 by the bolts 28, the ribs 29 of part 21 are positioned to non-rotatably engage and interlock with one of the ribs 15a on collar 9, and the ribs 29' on part 21' will then non-rotatably engage and interlock with ribs 19 on collar 16 at a position substantially diametrically opposite to the engaged rib 15a.

When the bolts 28 are tightly drawn up, the collars 9 and 16 are securely coupled against movement, so that the arm member 7 is securely held against rotation on the standard 6. If it is desired to adjust the arm 7 to a different radial position with respect to the standard, the bolts 28 are independently adjusted, one of the bolts 28 being loosened and the other tightened, thereby causing coupling part 21 and collar 9 engaged therewith to rotate slightly on collar 16, the collar 16 being rigidly secured to standard 6 and coupling part 21' being engaged with said collar 16.

Referring to Fig. 3, if the coupling is clamped around collars 9 and 16 to connect the arm to the standard so that the arm occupies the radial position indicated in dotted lines, by loosening the lower bolt 28 and then tightening the upper bolt 28, the coupling part 21 and collar 9 engaged thereby can be rotated about collar 16 to swing the arm 7 to a radial position such as is indicated in dot-dash lines, and when the upper bolt 28 is fully tightened, the arm will be securely clamped in the adjusted position. As shown in Figs. 3 and 4 the bores 27 and 27' are enlarged to permit canting of the bolts 28 therein when the arm is thus adjusted.

In the installation of a standard and lateral arm using the novel coupling means, the cables 12 are first inserted through the standard 6, and then through the arm 7 before the arm is connected to the top of the standard. The collar 9 of the arm is then positioned on the collar 16 of the standard and the coupling parts 21 and 21' clamped around the collars 9 and 16 with the ribs 29 and 29' respectively engaging and interlocking with ribs 15a and 19.

After the arm 7 is thus coupled in place on the standard, the arm may be adjusted radially so as to position it at right angles to the curb or center line of the street on which the standard is located, or to any desired radial position, by loosening one of the bolts 28 and tightening the other in the manner described. After the bolts 28 are again fully tightened, the arm will be securely clamped in the desired adjusted position and cannot move radially with respect to the standard except by further manipulating the bolts as aforesaid.

The present improved coupling is inexpensive to manufacture, and provides means for quickly and easily adjusting and then clamping a lamp bracket arm in any desired radial position, after the arm has been mounted in place on the standard. Moreover, the coupling does not project into the interior of the joint between the connected members so as to interfere with the passage of conductor cables therethrough.

Obviously, the improved coupling is not limited in its application to lamp standards having bracket arms connected thereto, but may be utilized in many other instances for connecting two members together and providing for rotatable adjustment of one member with respect to the other, as well as providing for securely clamping the members in any adjusted position.

I claim:

1. Coupling construction for connecting a lateral arm to the top of a standard including two coupling parts, each of said coupling parts having V-shaped inner surfaces for engaging oppositely inclined corrugated surfaces on the abutting portions of said standard and arm, a rib on said inner surface of one coupling part for interlocking with said inclined corrugated surface on said standard, a rib on the inner surface of the other coupling part for interlocking with said oppositely inclined corrugated surface on the lateral arm, and independently adjustable elements for clamping said coupling parts to the standard and arm for connecting the same together, whereby said lateral arm may be rotatably adjusted on said standard by adjusting said clamping elements.

2. Coupling construction for connecting two members together in slidably abutting relation, including two separable parts, one of said coupling parts having means for interlocking with one member against relative rotation, the other of said coupling parts having means for interlocking with the other member against relative rotation, and means for clamping said coupling parts to said members for connecting said members together in slidably abutting relation, said coupling parts being relatively adjustable to provide for relative rotation between said members.

3. Coupling construction for connecting two members together in slidably abutting relation, including two separable parts each having V-shaped inner surfaces for engaging oppositely inclined surfaces on the abutting portions of said members, one of said coupling parts having means for interlocking with one member against relative rotation, the other of said coupling parts having means for interlocking with the other member against relative rotation, and means for clamping said coupling parts to said members for connecting said members together in slidably abutting relation, said coupling parts being relatively adjustable to provide for relative rotation between said members.

HARRY O. RASTETTER.